US012734584B2

(12) United States Patent
Ahn et al.

(10) Patent No.: US 12,734,584 B2
(45) Date of Patent: Sep. 15, 2026

(54) HARD COATING FOR CUTTING TOOLS WITH EXCELLENT WEAR RESISTANCE

(71) Applicant: KORLOY INC., Seoul (KR)

(72) Inventors: Seung Su Ahn, Cheongju-si (KR); Je Hun Park, Cheongju-si (KR); Yeong Ju Jo, Cheongju-si (KR); Ji Woong Kim, Cheongju-si (KR); Myung Jae Kim, Cheongju-si (KR); Hyo Kyeong Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 393 days.

(21) Appl. No.: 18/528,932

(22) Filed: Dec. 5, 2023

(65) Prior Publication Data

US 2024/0216999 A1 Jul. 4, 2024

(30) Foreign Application Priority Data

Dec. 22, 2022 (KR) ........................ 10-2022-0181851

(51) Int. Cl.
*C23C 28/04* (2006.01)
*B23B 27/14* (2006.01)

(52) U.S. Cl.
CPC .......... *B23B 27/148* (2013.01); *C23C 28/044* (2013.01)

(58) Field of Classification Search
None
See application file for complete search history.

(56) References Cited

FOREIGN PATENT DOCUMENTS

| | | | |
|---|---|---|---|
| JP | H07180038 | | 7/1995 |
| JP | H07180038 A | * | 7/1995 |
| JP | 2009197268 | | 9/2009 |
| JP | 2009203485 | | 9/2009 |
| JP | 2009203489 | | 9/2009 |
| JP | 2009203489 A | * | 9/2009 |
| JP | 2020055041 A | * | 4/2020 |
| JP | 2022-100310 | | 7/2022 |

* cited by examiner

*Primary Examiner* — Kim S. Horger
(74) *Attorney, Agent, or Firm* — LEX IP MEISTER, PLLC

(57) ABSTRACT

The purpose of the invention is to provide a hard coating for cutting tools, wherein the hard coating is excellent in wear resistance and oxidation resistance, as well as in hardness properties. In order to achieve the purpose, the invention may provide a cutting tool which includes as hard substrate and a hard coating formed on the hard substrate, wherein the hard coating has a structure in which a first sub-coating having a composition range represented by [Formula 1] below and having a cubic structure, and a second sub-coating having a composition range represented by [Formula 2] below and having a cubic structure are alternately stacked.

$Al_{1-x}Mn_xN(0.005 \leq x \leq 0.1)$ [Formula 1]

MeN(Here, Me includes one or more selected among Ti, Cr, Zr, Hf, V, Nb, Ta, Mo, and Al) [Formula 2]

6 Claims, 3 Drawing Sheets

【FIG.1】
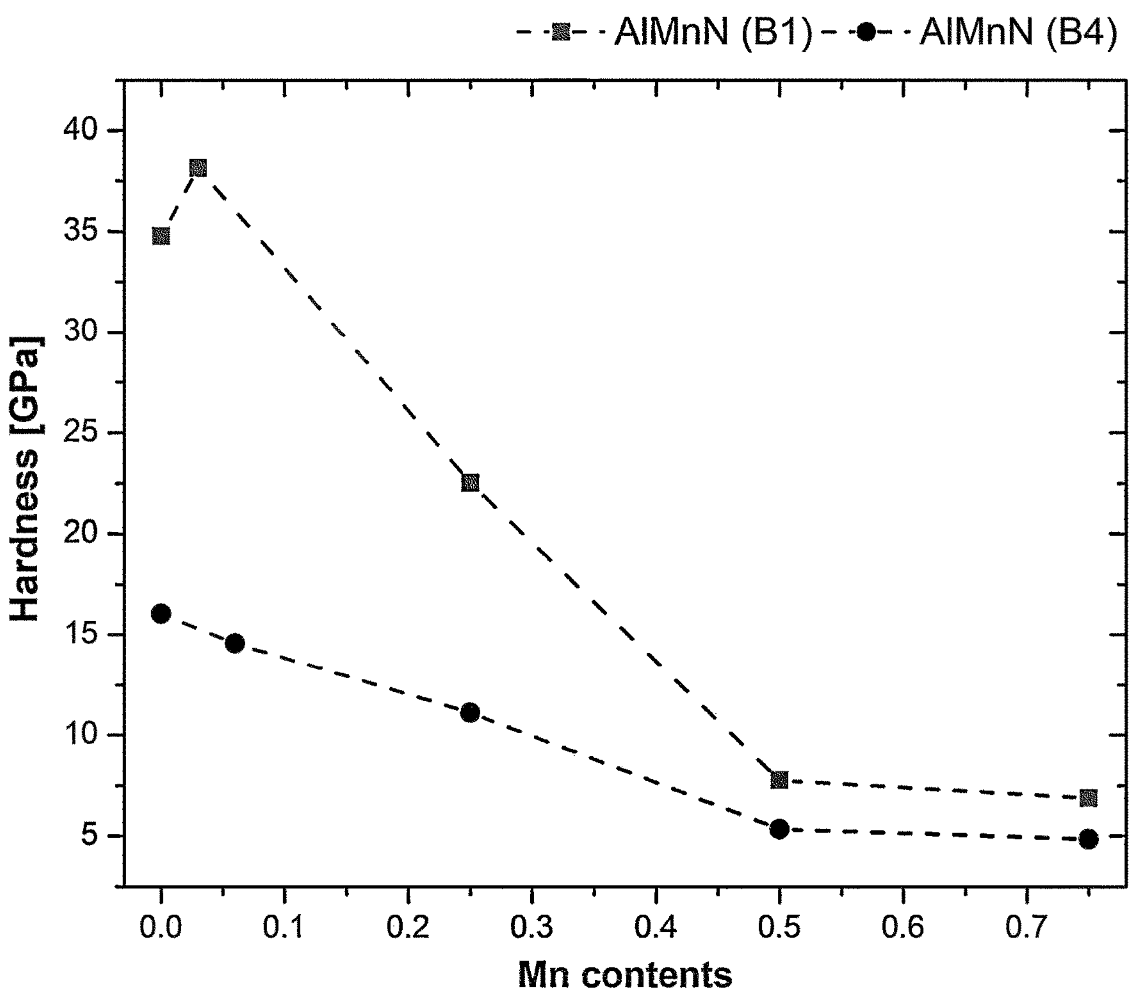

【FIG.2】
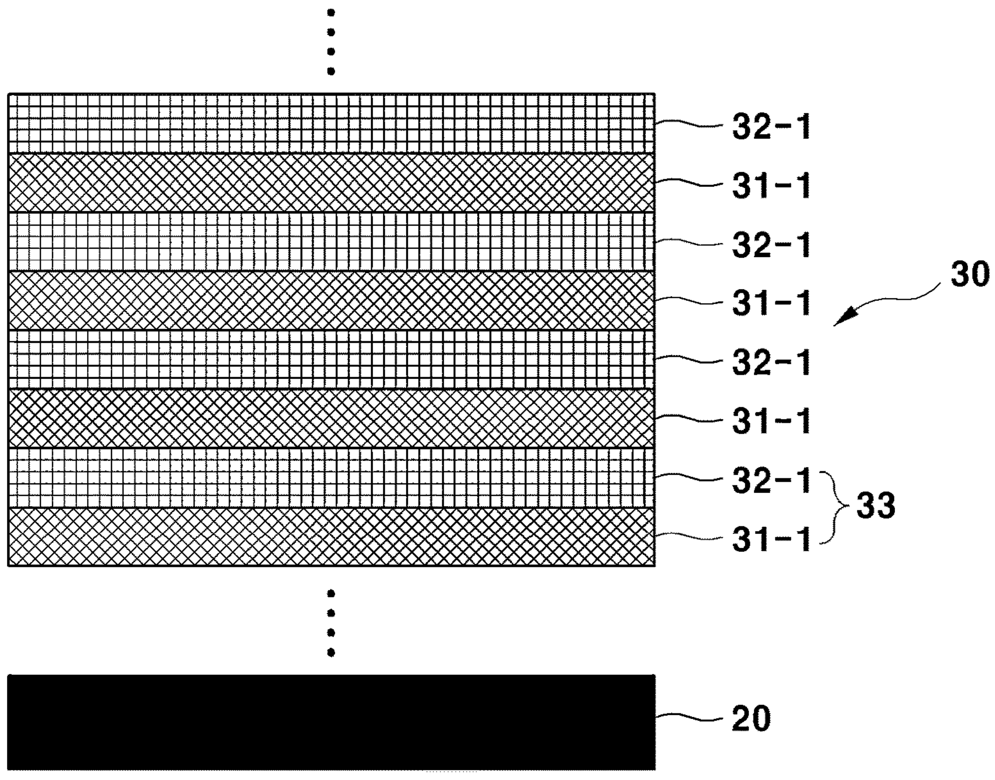
【FIG.3】
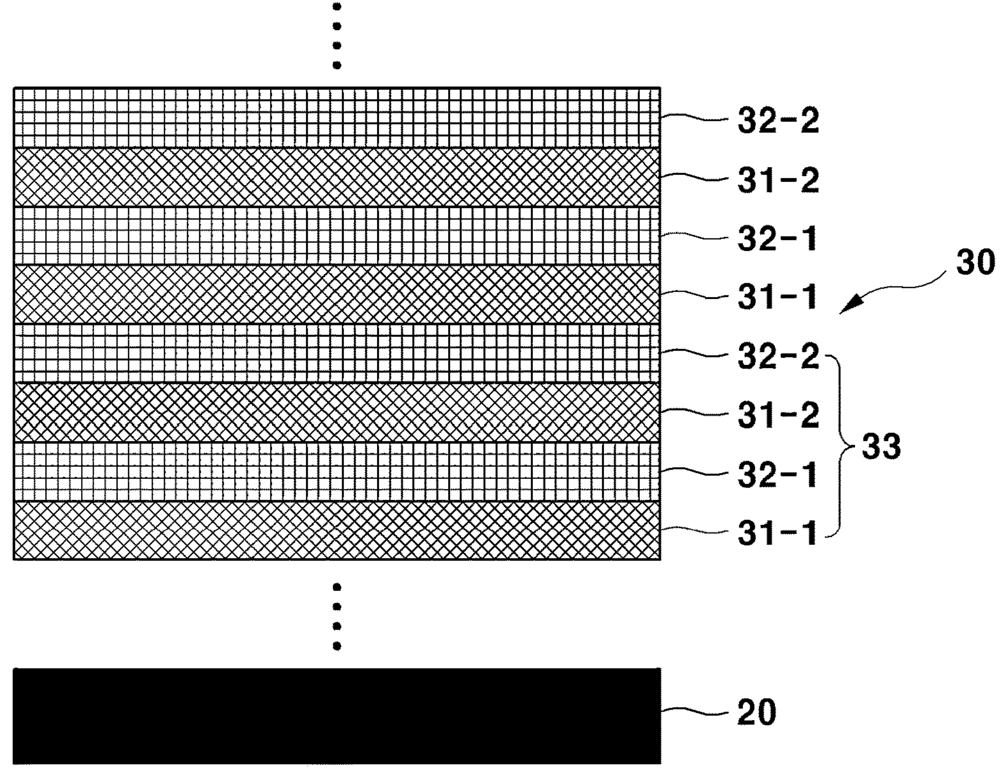

【FIG.4】
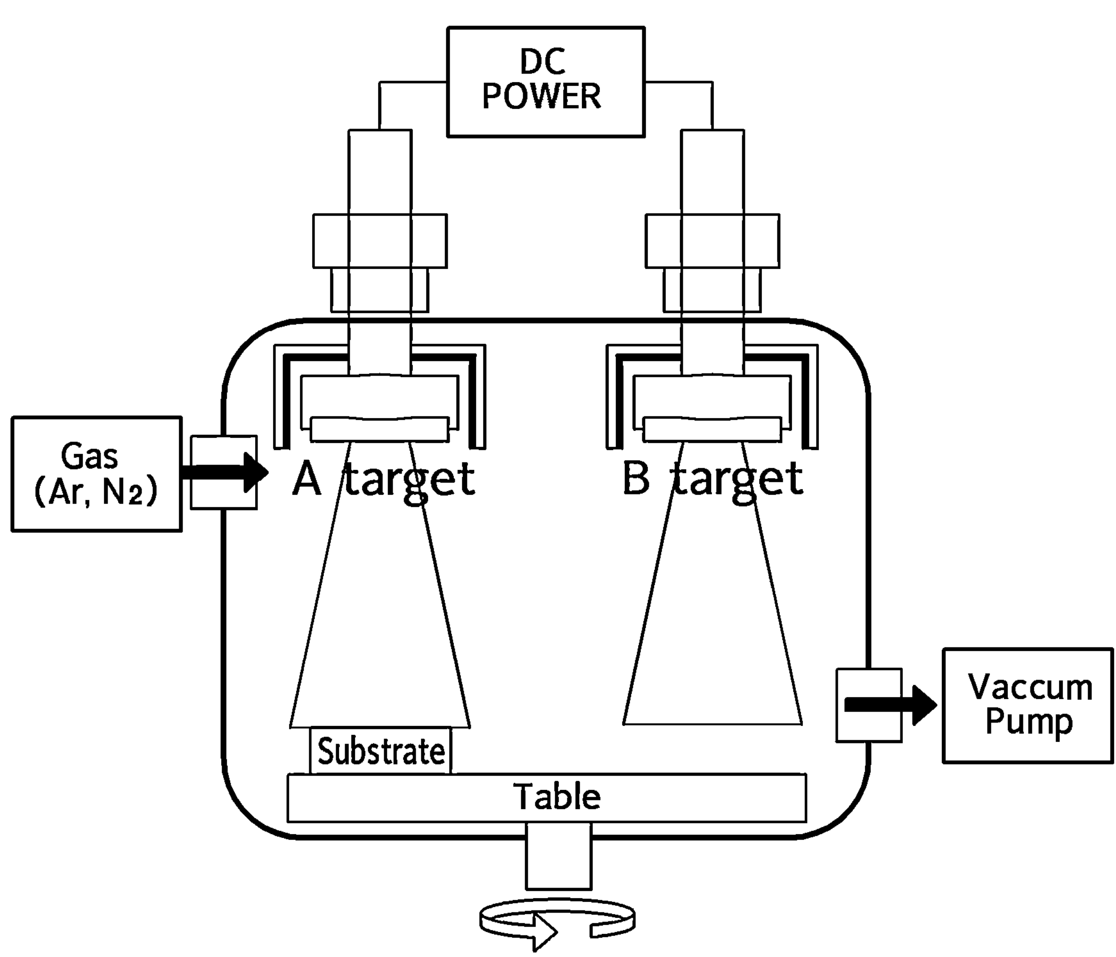

HARD COATING FOR CUTTING TOOLS WITH EXCELLENT WEAR RESISTANCE

BACKGROUND OF THE INVENTION

1. Field of the Invention

The present invention relates to a hard coating formed on a hard base material, such as cemented carbide, cermet, ceramic, and cubic boron nitride used in a cutting tool, and more specifically, to an AlMnN-based hard coating of a cubic structure formed on a hard substrate.

2. Description of the Related Art

In a cutting tool, oxidation and deterioration of continuously occur on a cutting blade due to heat generated during a cutting process. As a result, the cutting blade has reduced hardness and is embrittled, causing the tool to be easily damaged.

In order to address the limitation, a method of depositing a thin film of TiN, TiAlN, AlN, or $Al_2O_3$, which is a hard coating, on a hard substrate such as cemented carbide, cermet, ceramic, or cubic boron nitride, is used. There is a continuous demand for extending the lifespan of a tool by improving oxidation resistance and mechanical strength through such a hard coating.

In hard coatings, AlXN(wherein X is a transition metal)-based thin films are excellent in wear resistance and oxidation resistance, and thus, are most widely used as coatings for cutting tools. In such a hard coating, the greater the Al content, the more excellent are oxidation resistance and wear resistance. However, although there is a difference depending on an X element, when the content of an Al element is about 50% to 70% or greater, there is a problem in that the hardness is drastically reduced as the hard coating has a crystal structure of a B4 hexagonal crystal structure.

SUMMARY OF THE INVENTION

The purpose of the invention is to provide a hard coating for cutting tools, wherein the hard coating is excellent in wear resistance and oxidation resistance, as well as in hardness properties.

According to an aspect of the invention, there is provided a cutting tool which includes a hard substrate and a hard coating formed on the hard substrate, wherein the hard coating has a structure in which a first sub-coating having a composition range represented by [Formula 1] below and having a cubic structure, and a second sub-coating having a composition represented by [Formula 2] below and having a cubic structure are alternately stacked.

[Formula 1]

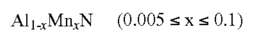

$Al_{1-x}Mn_xN \quad (0.005 \le x \le 0.1)$

MeN(Here, Me includes one or more selected among Ti, Cr, Zr, Hf, V, Nb, Ta, Mo, and Al) [Formula 2]

In addition, in the cutting tool according to an embodiment of the invention, x in [Formula 1] above may be in the range of 0.005×0.05.

In addition, in the cutting tool according to an embodiment of the invention, the sum of the thickness of one first sub-coating and the thickness of one second sub-coating, which are successive coatings, may be in the rage of 1 nm to 40 nm.

In addition, in the cutting tool according to an embodiment of the invention, the thickness of the hard coating may be in the range of 0.5 μm to 20 μm.

In addition, in the cutting tool according to an embodiment of the invention, the hard coating may not show a B4 hexagonal structure in analysis through XRD.

In addition, in the cutting tool according to an embodiment of the invention, the difference between the lattice constant of the first sub-coating and the lattice constant of the second sub-coating may be 10% or less based on the lattice constant of the first sub-coating.

ADVANTAGEOUS EFFECTS

According to the invention, it is possible to obtain a cutting tool having a hard coating, wherein the hard coating has high wear resistance and oxidation resistance, and at the same time, maintains high hardness.

BRIEF DESCRIPTION OF THE DRAWINGS

FIG. 1 is a graph showing hardness according to the content of Mn in an AlN-based hard coating;

FIG. 2 is a schematic diagram describing a cross-section of an embodiment of a cutting tool according to the invention;

FIG. 3 is a schematic diagram describing a cross-section of an embodiment of a cutting tool according to the invention; and FIG. 4 is a schematic diagram describing a PVD sputtering coating system used to film a hard film according to the present invention.

DETAILED DESCRIPTION OF THE EXEMPLARY EMBODIMENTS

In the following description of the present invention, when it is determined that detailed descriptions of related known functions or configurations may unnecessarily obscure the gist of the present invention, the detailed descriptions will be omitted. In addition, when a portion is said to 'include' any component, it means that the portion may further include other components rather than excluding the other components unless otherwise stated.

The invention relates to a cutting tool including a hard substrate and a hard coating formed on the hard substrate, wherein the hard coating has a structure in which a first sub-coating having a composition range represented by [Formula 1] below and having a cubic structure, and a second sub-coating having a composition represented by [Formula 2] below and having a cubic structure are alternately stacked.

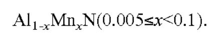

$Al_{1-x}Mn_xN(0.005 \le x < 0.1)$. [Formula 1]

MeN(Here, Me includes one or more selected among Ti, Cr, Zr, Hf, V, Nb, Ta, Mo, and Al) [Formula 2]

There are AlN-based coatings as hard coatings formed on hard substrates such as cemented carbide, cermet, ceramic, and cubic boron nitride to increase the cutting ability and durability of cutting tools while protecting the hard substrates. Among AlN-based hard coatings, AlTiN films generally have an Al content of 60% or less, and this is because when the Al content in an AlTiN-based coating is 70% or greater, the coating basically has a B4 hexagonal structure and has a hardness of about 16 GPa or less, which makes it less effective to use the coating as a coating for cutting tools.

From the graph of FIG. 1 derived through the First-principles calculation, the inventors of the invention have confirmed that an AlMnN-based coating may have more excellent mechanical properties when the coating has a cubic structure rather than a hexagonal structure, and particularly, AlN having a cubic structure and containing a small amount of Mn may have an increased hardness of about 38 GPa.

However, the stable phase of an AlN-based coatings is a hexagonal structure, and there is a difficulty in stably forming and maintaining a cubic structure only with an AlMnN coating containing a small amount of Mn. In order to address the limitation, in the invention, a first sub-coating, which is an AlMnN coating, and a second sub-coating, which is an MeN coating of another cubic structure may be alternately stacked to obtain a hard coating with excellent mechanical strength. By forming a nano-multilayer composed of the first sub-coating and the second sub-coating as described above, a superlattice is formed and a hard coating of a stable cubic structure may be formed and maintained.

The first sub-coating is an AlMnN coating and has the formula of $Al_{1-x}Mn_xN$, wherein x is in the rage of 0.005 to 0.1.

When x is 0.005 or greater, it is possible to form a cubic AlMnN coating with higher hardness compared to AlN, and when greater than 0.1, the hardness may be degraded. This can be seen in FIG. 1, which predicts the hardness of an AlMnN hard coating according to an Mn content, and it can be seen that the hardness of an AlMnN hard coating having a cubic structure (B1) is higher than that of an AlMnN hard coating having a hexagonal structure (B4), and that the content of Mn in the cubic structure (B1) reaches the maximum value when the value of x in [Formula 1] is 0.03 and decreases thereafter. Therefore, the value of x in [Formula 1] is preferably 0.005 to 0.1, and more preferably 0.005 to 0.05.

The second sub-coating is a metal nitride layer represented by [Formula 2], wherein Me, which is a metal, may include one or more selected among Ti, Cr, Zr, Hf, V, Nb, Ta, Mo, and Al.

These metal nitrides are advantageous in maintaining a cubical structure and may form a hard coating with excellent mechanical strength.

Meanwhile, the first sub-coating and the second sub-coating are alternately stacked, and the first sub-coating or the second sub-coating, which is repeated, may be stacked with the same composition, or the first sub-coating or the second sub-coating with a slightly different composition may be stacked.

FIGS. 2 and 3 are drawings which describe a hard coating formed on a hard substrate. FIG. 2 shows that a first sub-coating 31-1 and a second sub-coating 32-1, which are repeated when a hard coating 30 is formed on a hard substrate 20, are repeatedly and alternately stacked in succession with the same composition. It shows that a group of sub-coatings 33, which is composed of the first sub-coating 31-1 and the second sub-coating 32-1, is repeatedly stacked.

In comparison, FIG. 3 is a drawing which describes that when repeated first sub-coatings 31-1 and 31-2 are alternately stacked with second sub-coatings 32-1 and 32-2, four sub-coatings with different compositions are alternately stacked. That is, the first sub-coating 31-1 and another first sub-coating 31-2 have different compositions, and the second sub-coating 32-1 and another second sub-coating 32-2 have different compositions. It shows that a group sub-coatings 34, which is composed of the first sub-coating 31-1, the second sub-coating 32-1, the first sub-coating 31-2, and the second sub-coating 32-2, is repeatedly stacked.

In the cutting tool according to the invention, the sum of the thickness of one first sub-coating and the thickness of one second sub-coating, which are successive coatings, may be in the rage of 1 nm to 40 nm.

Since the first sub-coating and the second sub-coating are continuous with each other and form a superlattice structure, an AlMnN coating of the first sub-coating may maintain a stable cubic structure. To this end, it is necessary that the sum of the thickness of one first sub-coating and the thickness of one second sub-coating, which are successive coatings, is 40 nm or less. If thicker than the above, it may be difficult to maintain the superlattice structure. In addition, if too thin, a multi-layered crystal lattice may not be exhibited, so it is necessary that the sum is 1 nm or greater.

In addition, in the cutting tool according to the invention, the thickness of the hard coating may be in the range of 0.5 μm to 20 μm. If the total thickness of the hard coating including the first sub-coating and the second sub-coating alternately stacked is less than 0.5 μm, which is too thin, sufficient wear resistance and oxidation resistance may not be achieved, and if greater than 20 μm, which is too thick, a peeling problem may occur due to internal stress.

In addition, in the cutting tool according to the invention, the hard coating may not show a B4 hexagonal structure in analysis through XRD.

As described above, the hard coating may exhibit better mechanical properties when having a cubic structure. Therefore, the hard coating according to the invention may be a hard coating of a cubic structure which does not include a hexagonal structure.

In addition, the difference between the lattice constant of the first sub-coating and the lattice constant of the second sub-coating may be 10% or less based on the lattice constant of the first sub-coating. If the difference in the lattice constant is too large, the bonding force between sub-coatings may decrease, and the internal stress may be increase, which is not preferable.

Hereinafter, in order to describe the invention in more detail, preferred embodiments according to the invention will be described in more detail. However, the invention is not limited to the embodiments described herein.

Example 1

In order to select a target material, the structure and mechanical properties of ternary nitrides $(Ti_{1-x}M_x)N$ and $(Al_{1-x}M_x)N$ were confirmed by performing the First-principles calculation based on an electron density theory based on the Vienna ab initio simulation package (VASP) code. The results are shown in [Table 1] below.

A target composition having a lattice constant difference of 10 or less was preferentially selected in order to form a superlattice during the formation of an $Al_{1-x}Mn_xN$/MeN-based film.

TABLE 1

| Thin film | Metal element ratio (at %) | Structure | Lattice constant [A] | Lattice constant difference (%) | Elastic modulus [GPa] |
|---|---|---|---|---|---|
| AlMnN | Al:Mn = 97:3 | B1 | 4.07 | 0 | 506.67 |
| TiN | Ti = 100 | B1 | 4.23 | 4% | 473.35 |
| CrN | Cr = 100 | B1 | 4.05 | 0% | 158.28 |
| ZrN | Zr = 100 | B1 | 4.59 | 13% | 368.77 |

TABLE 1-continued

| Thin film | Metal element ratio (at %) | Structure | Lattice constant [A] | Lattice constant difference (%) | Elastic modulus [GPa] |
|---|---|---|---|---|---|
| HfN | Hf = 100 | B1 | 4.53 | 11% | 390.13 |
| VN | V = 100 | B1 | 4.12 | 1% | 400.37 |
| NbN | Nb = 100 | B1 | 4.45 | 9% | 320.09 |
| TaN | Ta = 100 | B1 | 4.25 | 4% | 447.24 |
| MoN | Mo = 100 | B1 | 4.35 | 7% | 302.09 |
| TiAlN | Ti:Al = 50:50 | B1 | 4.18 | 3% | 452.18 |
| CrAlN | Cr:Al = 50:50 | B1 | 4.09 | 0% | 380.69 |
| ZrAlN | Zr:Al = 50:50 | B1 | 4.38 | 8% | 378.45 |
| HfAlN | Hf:Al = 50:50 | B1 | 4.35 | 7% | 407.44 |
| VAlN | V:Al = 50:50 | B1 | 4.10 | 1% | 458.90 |
| NbAlN | Nb:Al = 50:50 | B1 | 4.28 | 5% | 416.82 |
| TaAlN | Ta:Al = 50:50 | B1 | 4.28 | 5% | 429.73 |
| MoAlN | Mo:Al = 50:50 | B1 | 4.25 | 4% | 368.28 |
| CrTiN | Cr:Ti = 50:50 | B1 | 4.16 | 2% | 343.12 |
| ZrTiN | Zr:Ti = 50:50 | B1 | 4.44 | 9% | 393.12 |
| HfTiN | Hf:Ti = 50:50 | B1 | 4.41 | 8% | 418.24 |
| VTiN | V:Ti = 50:50 | B1 | 4.19 | 3% | 411.58 |
| NbTiN | Nb:Ti = 50:50 | B1 | 4.36 | 7% | 365.14 |
| TaTiN | Ta:Ti = 50:50 | B1 | 4.34 | 7% | 371.02 |
| MoTiN | Mo:Ti = 50:50 | B1 | 4.30 | 6% | 352.75 |

<Formation of Hard Coating>

An $Al_{1-x}Mn_xN$/MeN-based nano-multilayer thin film was formed using a PVD sputtering coating system as shown in FIG. 4. The thin film was manufactured by controlling coating, after vacuum evacuation to $5\times10^{-5}$ Torr, under the conditions of a film formation substrate temperature of 500° C., a process pressure of 7 m Torr, a gas flow rate ratio of Ar:N2=6:1, a target power of 700 W, a substrate bias of −100 V, and a table rotation speed of 3 RPM to 0.2 RPM depending on a deposition rate, and the film formation was performed with a coating thickness of about 2 μm.

The thickness of the thin film was measured using a scanning electron microscope (SEM) on a fractured surface of the manufactured sample, and the stacking cycle was calculated by dividing the measured thickness of the thin film by the number of rotations of the table during the coating. The hardness was measured using the HM2000 equipment by Helmut Fischer company. The crystal structure of the thin film was analyzed using an X-ray diffraction analyzer.

The cutting evaluation was conducted by measuring the total chip removal amount using a vertical machining center. A test sample was prepared by depositing a coating on a substrate with the model name of ADKT120408PDSR-ML and the grade name of PP5300.

A material to be cut was evaluated under the wet processing conditions of an Inconel of 718, a cutting speed of 35 m/min, a feed of 0.11 vmm/t, an axial direction cutting depth (ap) of 5 mm, a radial direction cutting depth (ae) of 3.1 mm, and a milling cutter diameter of 32 mm (4 blades). The termination point of time for horizontal determination was set to an uniform width of flank wear (VB) of 3.5 mm or greater or an uneven chipping amount of 1.2 mm or greater.

The results of evaluating physical properties in accordance therewith are shown in Table 2 below.

TABLE 2

| | Target composition (at %) | | Analysis | | | | |
|---|---|---|---|---|---|---|---|
| Classification | Target A | Target B | Stacking cycle (nm) | Thickness [μm] | Hardness [GPa] | Crystal structure | Cutting process amount ($cm^3$) |
| Comparative Example 1 | Al97Mn3 | — | — | 2.5 | 14.3 | B4 | 53 |
| Comparative Example 2 | — | Ti | — | 2.1 | 14.6 | B1 | 37 |
| Example 1 | Al97Mn3 | Ti | 9 | 1.8 | 24.5 | B1 | 323 |
| Comparative Example 3 | Al97Mn3 | Ti | 82 | 1.7 | 19.4 | B1, B4 | 77 |
| Comparative Example 4 | — | Ti5Al5 | — | 2.6 | 18.7 | B1 | 107 |
| Example 2 | Al97Mn3 | Ti5Al5 | 8 | 1.9 | 25.6 | B1 | 431 |
| Comparative Example 5 | Al97Mn3 | Ti5Al5 | 80 | 1.8 | 20.8 | B1, B4 | 77 |
| Comparative Example 6 | — | Cr | — | 2.8 | 20.9 | B1 | 107 |
| Example 3 | Al97Mn3 | Cr | 9 | 2.6 | 24.1 | B1 | 215 |
| Comparative Example 7 | — | Cr5Ti5 | — | 2.5 | 13.0 | B1 | 53 |
| Example 4 | Al97Mn3 | Cr5Ti5 | 10 | 2.6 | 24.1 | B2 | 323 |
| Comparative Example 8 | — | Cr5Al5 | — | 2.7 | 18.7 | B1 | 107 |
| Example 5 | Al97Mn3 | Cr5Al5 | 9 | 2.3 | 24.1 | B1 | 323 |
| Comparative Example 9 | — | Zr | — | 1.8 | 16.7 | B1 | 107 |
| Comparative Example 10 | Al97Mn3 | Zr | 11 | 2.3 | 19.7 | B1 | 77 |
| Comparative Example 11 | — | Zr5Al5 | — | 2.3 | 20.3 | B1 | 77 |
| Example 6 | Al97Mn3 | Zr5Al5 | 12 | 2.8 | 29.1 | B1 | 323 |
| Comparative Example 12 | — | Zr5Ti5 | — | 3.0 | 19.7 | B1 | 107 |
| Example 7 | Al97Mn3 | Zr5Ti5 | 8 | 1.9 | 27.5 | B1 | 269 |
| Comparative Example 13 | — | Nb | — | 1.7 | 24.8 | B1 | 37 |

TABLE 2-continued

| | Target composition (at %) | | Analysis | | | | |
|---|---|---|---|---|---|---|---|
| Classification | Target A | Target B | Stacking cycle (nm) | Thickness [μm] | Hardness [GPa] | Crystal structure | Cutting process amount ($cm^3$) |
| Example 8 | Al97Mn3 | Nb | 11 | 2.0 | 33.7 | B1 | 161 |
| Comparative Example 14 | — | Nb5Al5 | — | 2.4 | 20.7 | B1 | 107 |
| Example 9 | Al97Mn3 | Nb5Al5 | 10 | 2.2 | 29.8 | B1 | 215 |
| Comparative Example 15 | — | Nb5Ti5 | — | 2.2 | 18.3 | B1 | 77 |
| Example 10 | Al97Mn3 | Nb5Ti5 | 11 | 2.4 | 29.3 | B1 | 215 |
| Comparative Example 16 | — | Hf | — | 1.7 | 16.9 | B1 | 37 |
| Comparative Example 17 | Al97Mn3 | Hf | 12 | 2.5 | 22.4 | B1 | 53 |
| Comparative Example 18 | — | Hf5Al5 | — | 2.1 | 22.2 | B1 | 77 |
| Example 11 | Al97Mn3 | Hf5Al5 | 10 | 2.0 | 31.1 | B1 | 161 |
| Comparative Example 19 | — | Hf5Ti5 | — | 1.8 | 21.7 | B1 | 53 |
| Example 12 | Al97Mn3 | Hf5Ti5 | 11 | 2.6 | 28.9 | B1 | 215 |
| Comparative Example 20 | — | V | — | 1.9 | 14.7 | B1 | 37 |
| Example 13 | Al97Mn3 | V | 9 | 2.1 | 27.8 | B1 | 161 |
| Comparative Example 21 | — | V5A15 | — | 1.8 | 24.6 | B1 | 77 |
| Example 14 | Al97Mn3 | V5A15 | 9 | 1.6 | 31.8 | B1 | 269 |
| Comparative Example 22 | — | V5Ti5 | — | 1.7 | 16.0 | B1 | 77 |
| Example 15 | Al97Mn3 | V5Ti5 | 10 | 1.8 | 26.6 | B1 | 215 |
| Comparative Example 23 | — | Ta | — | 1.9 | 9.6 | B1 | 37 |
| Example 16 | Al97Mn3 | Ta | 8 | 1.6 | 24.7 | B1 | 161 |
| Comparative Example 24 | — | Ta5Al5 | — | 2.1 | 20.9 | B1 | 107 |
| Example 17 | Al97Mn3 | Ta5Al5 | 10 | 2.3 | 26.7 | B1 | 161 |
| Comparative Example 25 | — | Ta5Ti5 | — | 1.7 | 13.4 | B1 | 77 |
| Example 18 | Al97Mn3 | Ta5Ti5 | 11 | 2.5 | 26.2 | B1 | 215 |
| Comparative Example 26 | — | Mo | — | 1.8 | 9.8 | B1 | 53 |
| Example 19 | Al97Mn3 | Mo | 9 | 1.8 | 23.5 | B1 | 215 |
| Comparative Example 27 | — | Mo5Al5 | — | 2.1 | 16.5 | B1 | 53 |
| Example 20 | Al97Mn3 | Mo5Al5 | 10 | 2.2 | 21.2 | B1 | 161 |
| Comparative Example 28 | — | Mo5Ti5 | — | 2.1 | 12.9 | B1 | 37 |
| Example 21 | Al97Mn3 | Mo5Ti5 | 10 | 2.0 | 22.1 | B1 | 161 |

What is claimed is:

1. A cutting tool comprising a hard substrate and a hard coating formed on the hard substrate, wherein the hard coating has a structure in which a first sub-coating having a composition range represented by [Formula 1] below and having a cubic structure and a second sub-coating having a composition represented by [Formula 2] below and having a cubic structure are alternately stacked:

$Al_{1-x}Mn_xN$, wherein $0.005 \leq x \leq 0.1$, [Formula 1]

MeN, wherein Me includes one or more selected among Ti, Cr, Zr, Hf, V, Nb, Ta, Mo, and Al) [Formula 2].

2. The cutting tool according to claim 1, wherein in [Formula 1] above, x is in the range of $0.005 \leq x \leq 0.05$.

3. The cutting tool according to claim 1, wherein a sum of the thickness of one first sub-coating and the thickness of one second sub-coating, which are successive coatings, is in the range of 1 nm to 40 nm.

4. The cutting tool according to claim 1, wherein the thickness of the hard coating is in the range of 0.5 μm to 20 μm.

5. The cutting tool of claim 1, wherein the hard coating does not show a B4 hexagonal structure in analysis through XRD.

6. The cutting tool of claim 1, wherein the difference between the lattice constant of the first sub-coating and the lattice constant of the second sub-coating is 10% or less based on the lattice constant of the first sub-coating.

* * * * *